United States Patent
Suzuki (10) Patent No.: US 6,483,866 B1
(45) Date of Patent: *Nov. 19, 2002

(54) MULTI-STATION TRANSMISSION METHOD AND RECEIVER FOR INVERSE TRANSFORMING TWO PSEUDO-ORTHOGONAL TRANSMISSION SEQUENCES USED FOR METRIC CALCULATION AND BASE STATION SELECTION BASED THEREON

(75) Inventor: Hiroshi Suzuki, Yokosuka (JP)

(73) Assignee: NTT Mobile Communications Network Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 168 days.

(21) Appl. No.: 08/374,692
(22) PCT Filed: Oct. 11, 1994
(86) PCT No.: PCT/JP94/01692
§ 371 (c)(1),
(2), (4) Date: Jan. 24, 1995
(87) PCT Pub. No.: WO95/10924
PCT Pub. Date: Apr. 20, 1995

(30) Foreign Application Priority Data

Oct. 12, 1993 (JP) ............................................. 5-254112

(51) Int. Cl.⁷ .......................... H04J 11/00; H04B 7/216
(52) U.S. Cl. ........................ 375/149; 375/150; 370/203; 370/320; 370/334
(58) Field of Search ................................ 375/200, 206, 375/130, 140, 141, 142, 143, 144, 145, 147, 148, 149, 150; 370/319, 320, 334, 335, 333, 332, 331, 342, 503, 507, 509, 510, 515, 203; 455/436, 437, 439, 442

(56) References Cited

U.S. PATENT DOCUMENTS

| | | | | |
|---|---|---|---|---|
| 3,815,028 A | * | 6/1974 | Rakow | 375/341 |
| 4,884,272 A | * | 11/1989 | McConnell | 371/43 |
| 5,109,390 A | * | 4/1992 | Gilhousen et al. | 375/1 |
| 5,179,571 A | | 1/1993 | Schilling | |
| 5,202,903 A | * | 4/1993 | Okanoue | 375/347 |
| 5,267,261 A | * | 11/1993 | Blakeney, II et al. | 375/1 |
| 5,289,499 A | * | 2/1994 | Weerackody | 375/206 |
| 5,351,274 A | * | 9/1994 | Chonnakeshu et al. | 375/347 |
| 5,450,453 A | * | 9/1995 | Frank | 375/200 |

FOREIGN PATENT DOCUMENTS

WO    WO 83/01878    5/1983

OTHER PUBLICATIONS

TIA/EIA Interim Standard—95, Mobile Station–Based Station Compatibility Standard for Dual Mode Wideband Spread Spectrum Cellular System. Chapter 7, Jul. 1993.*

* cited by examiner

Primary Examiner—William Luther
(74) Attorney, Agent, or Firm—Connolly Bove Lodge & Hutz LLP

(57) ABSTRACT

In a multi-station transmission method and receiver using training signals, a forward signal is transformed in a signal transformation part to two pseudo-orthogonal transmission signal sequences, which are framed in base stations of two adjacent zones and augmented with orthogonal training signals, thereafter being transmitted over the same channels. A signal received by a receiver of a mobile station is separated, by a signal separation part using the training signals corresponding to the respective base stations, into signal sequences received from the respective base stations. The received signal sequences are subjected to an inverse transformation by inverse transformation circuits to obtain two transmitted signal sequences, and one of these signal sequences which has a larger metric is selectively outputted.

8 Claims, 4 Drawing Sheets

MULTI-STATION TRANSMISSION METHOD AND RECEIVER FOR INVERSE TRANSFORMING TWO PSEUDO-ORTHOGONAL TRANSMISSION SEQUENCES USED FOR METRIC CALCULATION AND BASE STATION SELECTION BASED THEREON

TECHNICAL FIELD

The present invention relates to a multi-station transmission method which is used in a mobile communication system and a broadcasting system to transmit the same signal from a plurality of stations with a view to holding the continuity of a signal in the vicinity of the one boundary, and the invention also pertains to a receiver therefor.

In radio communication, especially in mobile communication, it is necessary to implement many channels in a limited frequency is an important technique For example, a cellular system has been employed in mobile communication, in the cellular system, the service area is divided into plurality of cells, i.e., zones, and different frequencies are assigned to the cells to prevent interference between them, but in a bid to promote the spatial reuse of frequency, it is customary to assign the same frequency to cells that are far enough apart not to interfere with each other. Such a cellular system requires a handoff capability which enables the mobile station to keep up conversation when it moves from one cell to another, that is, from one zone to another.

Figure 1:
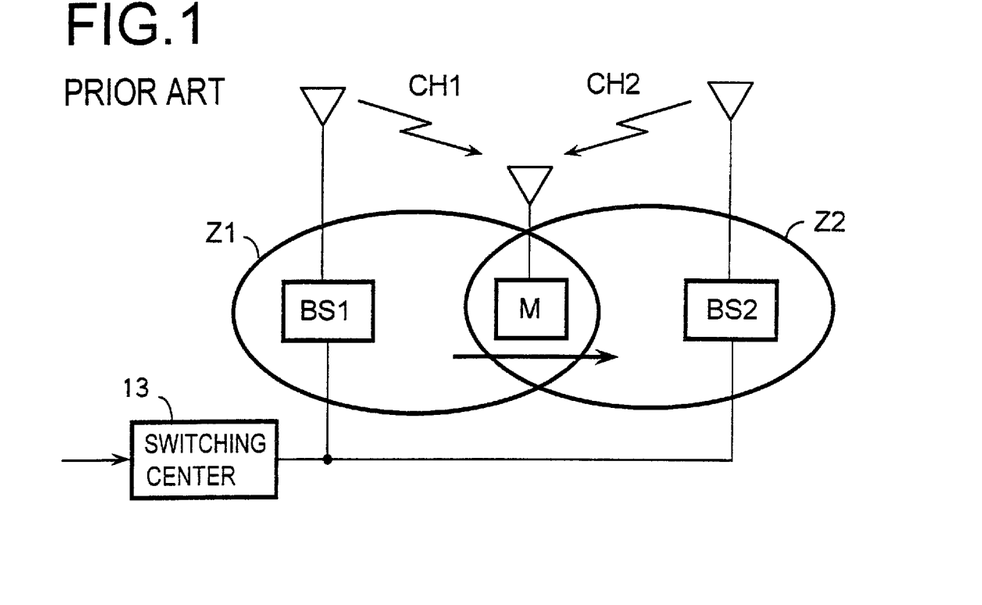
FIG. 1 is a block diagram showing the principles of a conventional zone switching scheme.

FIG. 1 shows the principles of a conventional zone switching scheme. Let it be assured that zones Z1 and Z2 covered by base stations BS1 and BS2 are adjacent and that a mobile station M is now moving across the boundary of the zones Z1 and Z2 in a direction from the base station BS1 toward the base station BS2. Forward signals to be sent from the base stations BS1 and BS2 to the mobile station M are transmitted from a switching center 13 to the two base stations BS1 and BS2 which are switched from the one to the other. A forward radio channel to the mobile station M is set first by a first channel CH1 via the base station BS1. When the field intensity of the first channel CH1 decreases with the movement of the mobile station M, a second channel CH2 is set as the forward radio channel via the base station BS2, while at the same time the first channel CH1 is cut off. Since an access channel is usually set up by a FDMA (Frequency Division Multiple Access) or TDMA (Time Division Multiple Access) scheme, the same channel cannot be used in adjacent zones. Hence, the two channels CH1 and CH2 use different carrier frequencies. On this account, the channels cannot continuously be switched from one to the other, inevitably resulting in a momentary interruption during switching. In voice communication this interruption can be made sufficiently short as not to seriously affect the speech quality, but in multimedia transmission such as visual or data communication the momentary interruption causes significant quality deterioration because of high-speed transmission of digital signals in many cases.

On the other hand, in zone switching by a CDMA (Code Division Multiple Access) scheme, a spreading code is used for channel setting and the same carrier frequency is used in common to adjacent zones. Then when a multi-station transmission is carried out using different spreading codes for the adjacent zones, signals from two base stations can easily be received and interruption-free reception is possible. However, this method is inherent to the CDMA scheme and cannot be applied to the FDMA and TDMA schemes. Furthermore, to identify the respective channel defined by the spreading code, it is necessary to use a different spreading code for each channel. There is another method which, instead of changing the spreading code, shifts its timing to avoid overlapping of pulses detected by the two inverse transformation circuits for despreading of the two base station is, but highly accurate transmission timing must be provided between the base stations.

On the other hand, a forward control signal in the mobile communication system needs to call up mobile stations over a wide area. To cover a wide area with a low transmission output, a multi-station transmission system is needed which divides the area into a plurality of zones and transmits the same signal to the respective zones.

In the multi-station transmission system, even if the same signals are transmitted from the respective zones, they do not completely match in terms of transmission carrier frequency and transmission data timing, posing a problem that the signals from the plurality of zones interfere with each other fit the boundary between them. To solve this problem, frequency offset type transmitter diversity or the like has been employed. This method is one that offsets the transmitter carrier frequency of each zone in the range of from ½ to ¼ of the modulation band and receives the frequency offset signals by a differential detector at the receiving side, thus enabling a diversity, reception. However, this method has a disadvantage in that if the data timing is not the same, interference will occur and the frequency offsetting enlarges the receiving band width correspondingly, making it hard to implement a narrow-band communication An object of the present invention is to provide a multi-station transmission method and a receiver therefor which, regardless of the access scheme used, allow zone switching free from signal discontinuity and enable simultaneous reception of identical signals from a 1 plurality of base stations without widening the receiving band, thereby implementing highly reliable reception based on the diversity effect.

SUMMARY OF THE INVENTION

In a mobile communication system in which the service area is broken up into a plurality of zones each having a base station and a mobile station performs communication via the base station of its visited zone, the multi-station transmission method according to the present invention, transmits the same signal from the base station of the visited zone and the base station of at least one adjacent zone when the mobile station moves across the boundary between its visited zone and the adjacent zone, the method comprising the following steps (a) the same forward signal sequence destined to the mobile station is transmitted to N base stations including the base station of the mobile station's visited zone and the base station of at least one adjacent zone, N being an integer equal to or greater than 2;

(b) each of the N base stations each converts the forward signal sequence to a transmission signal sequence and adds predetermined pseudo-orthogonal training signals to the transmission signal sequence for each frame to generate a framed signal sequence;

(c) the N base stations each send the framed signal sequence by a transmission radio wave of the same channel; and (d) said mobile station receives the transmitted radio wave from each base station, then separates It into N transmitted signal sequences from the N base stations through utilization of the previously known N training signals and obtains a desired received signal sequence from the transmitted signal sequences.

The receiver according to the present invention, is provided with: separating means which separates received waves of the same channel by their training signals into a plurality of signal sequences corresponding to the training signals, respectively; inverse transformation means which subject these separated signal sequences to transformation inverse from that effected thereon at the transmitting sides to restore the original signal sequences; and means which outputs that one of the restored signal sequences which is high in reliability at the time of separation.

BEST MODE FOR CARRYING OUT THE INVENTION

Figure 2:
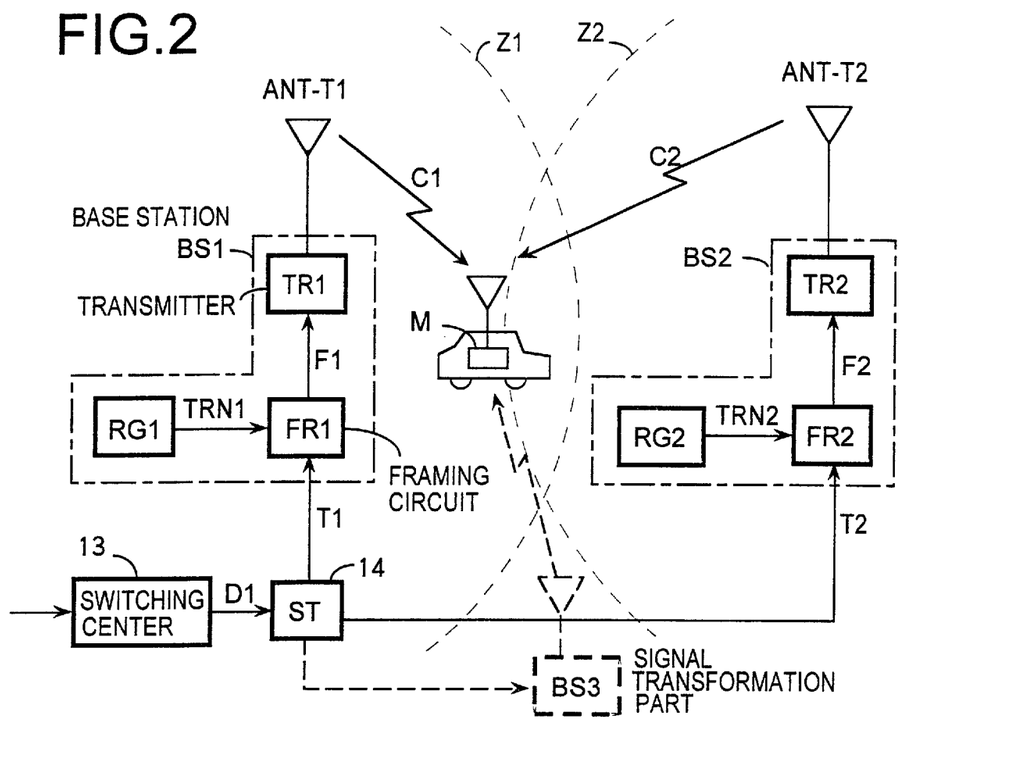
FIG. 2 is a block diagram illustrating the transmitting side in an embodiment of the present invention.
Figure 3A:
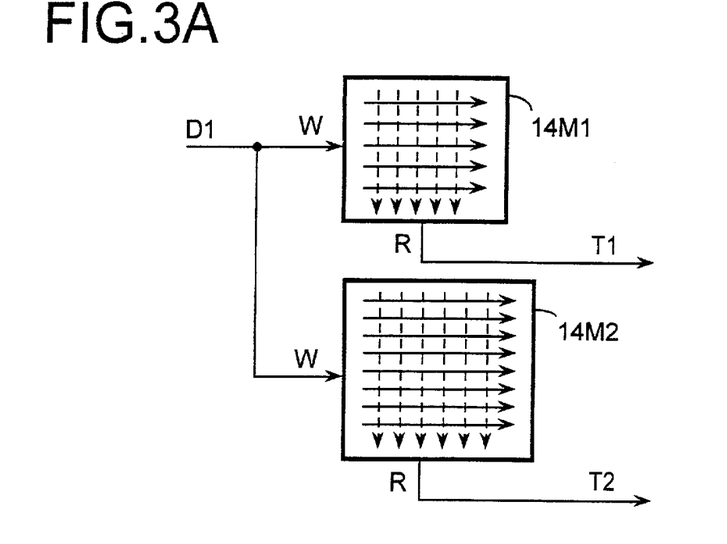
FIG. 3A is a diagram showing the construction of a signal transformation part 14 in FIG. 2 when it is implemented by an interleave scheme using memories.

In FIG. 2 there is illustrated the base station side of an embodiment according to the present invention At the base station side, a forward input signal DI destined for a mobile station M is input into a signal transformation part 14 from a switching center 13. The forward signal DI is transformed by the signal transformation part 14 into two different transmission signal sequences T1 and T2. This transformation is intended to enable the two transmission signal sequences T1 and T2 to be regarded as statistically independent (i.e., orthogonal or pseudo-orthogonal) signal sequences which have substantially zero cross-correlation of ±10 symbols or so this is done by interleaves of different sizes, example. The transformation by interleaving is performed, as schematically shown in FIG. 3A, by writing the signal sequence DI into memories 14M1 and 14M2 of different sizes in the row direction as indicated by the broken line arrows and then reading out the memories 14M1 and 14M2 in the column direction as indicated by the full-line arrows. By using memories of the same size but different in the length-to-width ratio, the interleaved signal sequences T1 and T2 become pseudo-orthogonal. Moreover, even if a burst-like error is induced on the transmission line, it is dispersed when the original signal sequence is restored by inverse transformation; hence, error correction is effectively made. Alternatively, the input signal DI may be divided into two transmission signal sequences T1 and T2 one of which is interleaved but the other of which is not.

Figure 3B:
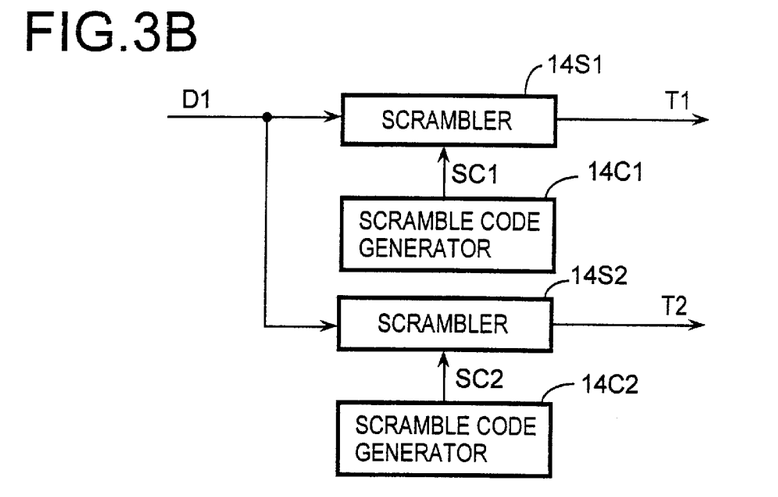
FIG. 3B is a diagram showing the construction of the signal transformation part 14 when it is implemented by a scramble scheme.

Another method of generating signal sequence of substantially zero cross-correlation is shown in FIG. 3B in which the transmission signal sequences T1 and T2 are generated by scrambling the input signal DI in scramblers 14S1 and 14S2 with different scramble codes SC1 and SC2 from scramble code generating parts 14C1 and 14C2. Also in this case, only one of the transmission signal sequences T1 and T2 may be formed by a scrambled version of the input signal DI. Incidentally, the signal transformation part 14 may be provided In the switching center 13, or its respective components may be provided in the corresponding base stations BS1 and BS2, or it may be provided singly. According to the present invention, as referred to later on, the training signals that are added to each frame in the base stations BS1 and BS2 need only to be at least orthogonal to each other and the signal transformation part 14 may be omitted. In such an instance, the input signal DI is applied to framing circuits FR1 and FR2 of the base stations BS1 and BS2. The signal transformation part 14 may add an error correcting code to each transmission signal sequence, if necessary.

Figure 4:
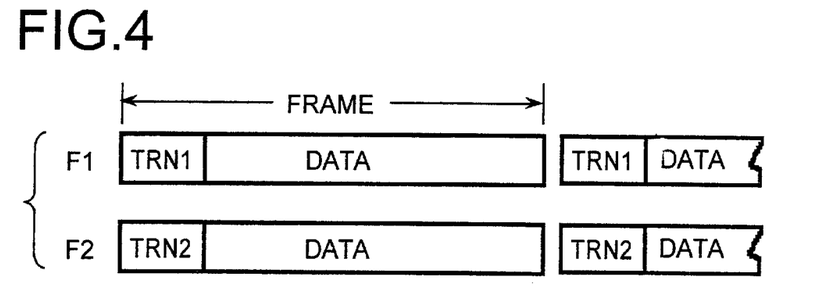
FIG. 4 is a diagram showing the frame configuration of a transmission signal.

These transmission signal sequences T1 and T2 are sent to the bass stations BS1 and BS2 in adjacent zones Z1 and Z2, respectively. In the base stations BS1 and BS2, the transmission signal sequences T1 and T2 are converted by framing circuits FR1 and FR2 to framed signal sequences F1 and F2, respectively. In the present invention, as shown in FIG. 4, different and inherent training signals TRN1 and TRN2, which are held in registers RG1 and RG2 in the base stations BS1 and BS2, are added to transmission data DAtA (the transmission signal sequences T1 and T2) of a fixed length to form respective frames. The training signals TRN1 and TRN2 used are those which are orthogonal or pseudo-orthogonal to each other, that is, signals such that the sum of multiplied values of corresponding symbols of the training signals TEN1 and TRN2 is substantially zero.

By using such signals of excellent orthogonality as the training signals TRN1 and TRN2, it is possible to increase the accuracy of coefficient setting (setting of a tap coefficient or setting of a weight coefficient) which is accompanied by correlation processing in a signal separation part 20 In FIG. 5 described later on. In the case where inter-symbol interference occurs owing to a delay time dispersion In a multi-path propagation path, however, equalization processing is involved in the signal separation part 20, hence respective multi-path components must be separated. To meet this requirement, the training signals TRN1 and TRN2 need to be excellent in auto-correlation characteristic as well as in orthogonality. That is, the auto correction function of each of the training signals TRN1 and TRN2 is preferably a function which has a sharp peak at a position corresponding to a time difference 0 (a phase difference 0) but becomes negligibly small in other regions. The training signals of excellent auto-correction can be used as signals for timing regeneration. Since the above-said two characteristics, that is, the orthogonality and the auto-correction property, influence each other, it is desirable to optimize them in the system employing the present invention.

The framed signal sequences F1 and F2 generated by the framed circuits FR1 and FR2 in FIG. 2 are converted by transmitters TR1 and TR2 to modulated waves C1 and C2, respectively, which are transmitted via transmitting antennas ANT-T1 and ANT-T2. Let it be assumed that the two modulated waves C1 and C2 use the same channel selected from a channel group of FDMA, TDMA and CDMA schemes. Furthermore, suppose that the transmitting antennas ANT-T1 and ANT-T2 are so distant from each other that when the two modulated waves C1 and C2 are received by the mobile station M, their variations by radio wave propagation can be sufficiently independent of each other.

Figure 5:
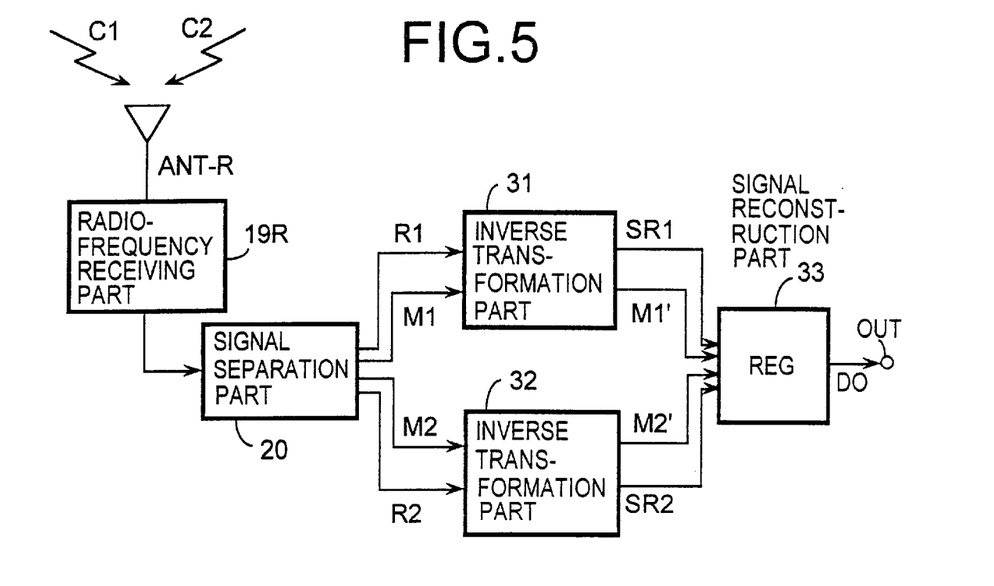
FIG. 5 is a block diagram of the receiving side in an embodiment of the present invention.

FIG. 5 is a block diagram illustrating the construction of each mobile station M. The mobile station M simultaneously receives the modulated waves C1 and C2 of the same channel as their combined wave by used of a receiving antenna ANT-R. The received signal is demodulated by a receiver 19R and the resulting base band signal is outputted therefrom as a digital signal. The base band signal is applied to a signal separation part 20 wherein it is amplified and then separated into received signal sequences R1 and R2 corresponding to the modulated waves C1 and C2. This separation uses the training signals contained in each of the modulated waves, and the separation can be carried out using the technique of what is called an interference canceller. The interference canceller schemes can be classified into a nonlinear interference canceller and a linear interference canceller. When only one receiving antenna ANT-R is used as in the case of FIG. 5, only the nonlinear interference canceller is applicable. When two or more receiving antennas are used, either of the nonlinear and linear interference cancellers can be used.

The operation of the linear interference canceller is disclosed in detail in R. T. -Compton, Jr., "Adaptive Antennas, Concept and Performance", Prentice-Hall, 1988 or Suzuki, "Signal Transmission Characteristics In Least Square Combining Diversity Reception", Journal of the Institute of Electronics, Information and Communication Engineers of Japan, B-II, vol. J75-B-II, No. 8, pp. 524–534, August, 1992: the operation of the nonlinear interference canceller is described in detail in Hitoshi Yoshino and Hiroshi Suzuki, "Adaptive Interference Canceller Extended from RLS-MLSE", Technical Report of the Institute of Electronics, Information and Communication Engineers of Japan, Technical Report RCS92-120 (1993-01). In either case, received signals from a predetermined number of base stations which can be predicted are separated into individual received signals, the received signals except a noted desired received signal are regarded as interference signals, and these separated interference signals are subtracted from the received signals of the combined received wave, by which the background noise of the desired received signal is remarkably reduced. The present invention separates all the received signals by similar processing, regarding the individual received signals as desired received signals.

The separated received signal sequences R1 and R2 are provided to inverse transformation circuits 31 and 32, wherein they are subjected to the inverse transformation processing shown in FIGS. 3A or 3B, by which transmitted signal sequences SR1 and SR2 are obtained as received signal sequences. The received signal sequences SR1 and SR2 are fed to a signal reconstruction part 33, which selects one of the received signal sequences on the basis of likelihood values M1' and M2' correrponding to estimated errors obtained in the signal separation processing in the signal separation part 20 and outputs the selected signal sequence to an output terminal OUT.

Figure 6A:
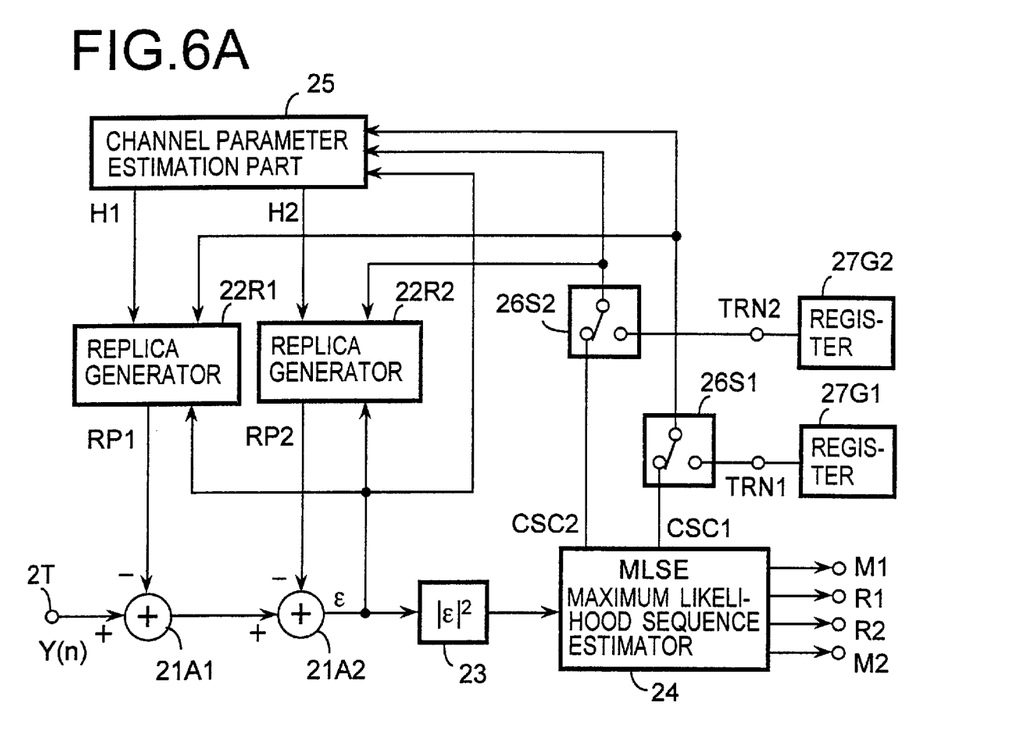
FIG. 6A in a block diagram of a nonlinear interference canceller forming the principal part of a signal separation part.
Figure 6B:
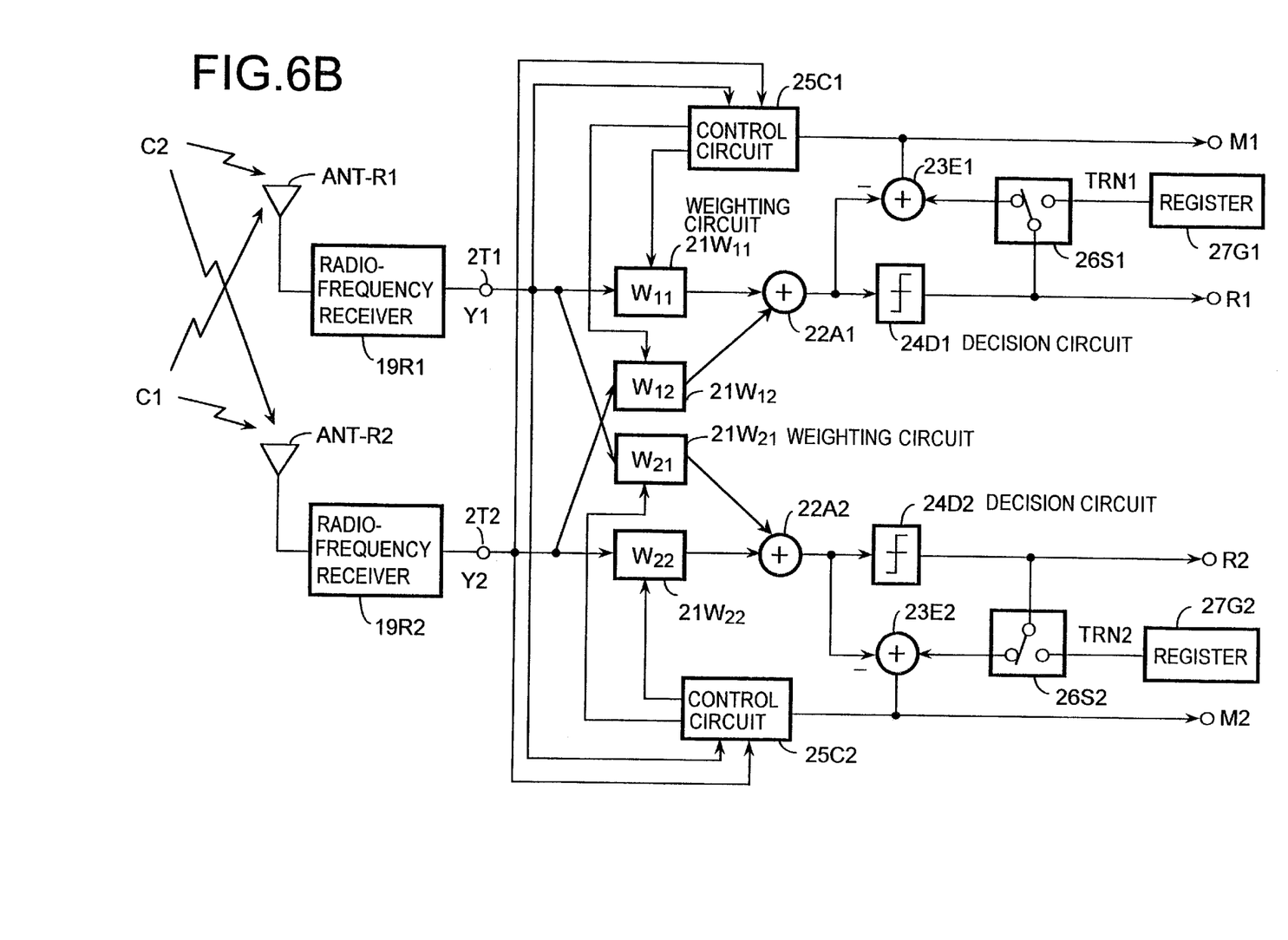
FIG. 6B is a block diagram illustrating a linear interference canceller.

Next, a description will be given of an example of the basic configuration of the interference canceller in the signal separation part 20. FIG. 6A is a block diagram of the non-linear interference canceller and FIG. 6B is a block diagram of the linear interference canceller. In the nonlinear interference canceller of FIG. 6A, a sample value Y(n) of the base band signal, obtained by the detection of the combined wave of the two modulated waves C1 and C2 by the receiver 19R, is provided as an input signal to an input terminal 2T.

On the other hand, upon each application of the input signal Y(n) to the is input terminal 2T, a maximum likelihood sequence estimator 24 generates two signal sequence candidates (code sequence candidates) CSC1 and CSC2 each having a predetermined number of states for signal transition and provides them to replica generators 22R1 and 22R2. The replica generators 22R1 and 22R2 are formed by transversal filters to which parameters for estimating the channel characteristics of the modulated waves C1 and C2, that is,.impulse responses H1 and H2 of respective channels, are provided as tap coefficients; the replica generators generate estimated signals or replicas RP1 and RP2 by inner product calculations (convoluting calculations) of the signal sequence candidates CSC1 and CSC2 and the tap coefficients H1 and H2.

These replicas RP1 and RP2 are provided to subtracters 21A1 and 21A2, wherein they are subtracted from the input signal Y(n) to obtain an estimation error $\epsilon$: this processing is repeated for all candidates of the two signal sequences. As a result, two code sequence candidates, for which the square $|\epsilon|^2$ of the estimation error available for a likelihood calculation pert 23, are determined an two most likely code sequences and estimated transmitted signals R1 and R2 are provided to output terminals on the basis of such code sequences. At the same time, metrics M1 and N2 of the code sequences are calculated from the estimation error $\epsilon$ and are outputted. The maximum likelihood sequence estimation method to described In the aforementioned literatures and is disclosed in detail in PCT Application Publication WO94/17600 (published Aug. 4, 1994) as well. For example, the Viterbi algorithm way be used as one of the maximum likelihood sequence estimation algorithms.

The mobile station M (FIG. 2) holds in registers. 27G1 and 27G2 training signal patterns TRN1 and TRN2 of the visited zone Z1 and the adjacent zone Z2 received from the base station BS1 via a control channel. Alternatively, the mobile station M prestores, as a table in a memory, the training signal patterns TRN1, RN2, . . . corresponding to identification numbers assigned to the zones Z1, Z2, . . . , in which case the training signal patterns are read out from the table by use of the identification numbers of the zone Z1 and the adjacent zone Z2 received via the control channel from the base station of the visited zone Z1 and are set in the registers 27G1 and 27G2. During the reception of the training signals TRN1 and TRN2 in each frame by the receiver 19R of the mobile station M, the respective training signal patterns TRN1 and TRN2 are provided from the registers 27G1 and 27G2 to the channel parameter estimation part 25 and the replica generators 22R1 and 22R2 via switches 26S1 and 26S2.

The replica generators 22R1 and 22R2 are controlled by the tap coefficients H1 and H2 provided thereto to generate replicas (estimated received signal training signals) of the received signals from the training signal patterns TRN1 and TRN2 and provide the replicas to the subtractors 21A1 and 21A2. The parameter estimation part 25 determines, for example, by an adaptive algorithm, the tap coefficients H1 and H2 for the training patterns TRN1 and TRN2 in such a manner as to minimize the power $|\epsilon|^2$ of the estimation error signal. The replica generators (transversal filters) 22R1 and 22R2, supplied with such tap coefficients H1 and H2, are regarded as simulating the characteristic (impulse response) of the channels over which the modulated signals C1 and C2 propagate, respectively. During the reception of the data DATA in the received frame, the tap coefficients H1 and H2 determined as mentioned above are provided to the replica generators 22R1 and 22R2 and the maximum likelihood sequence estimator 24 makes a maximum estimation of a pair of transmitted signal sequences (transmitted data) as described previously. Furthermore, the maximum likelihood sequence estimator calculates and outputs the metrics (the reliability of the estimated signal sequences) M1 and M2 of the decision paths from the likelihood ($1/|\epsilon|^2$, for example) used for the decision of the signal sequences R1 and R2 by a known method. When the input signal sequence is transformed in the signal transformation part 14 to the transmission signal sequences T1 and T2 which are pseudo-orthogonal to each other as depicted in FIG. 2, the tap coefficients H1 and H2 can be corrected, as required, in the above-described fashion to minimize the estimation error power $|\epsilon|^2$ again through utilization of the two decided transmitted signal sequences during the data DATA receiving period. In the example of FIG. 6A, the metrics M1 and M2 are the same value. While in the above the operation by a single branch has been described, the configuration of diversity reception is also possible, in which case, too, the interference canceller similarly operates.

FIG. 6B shown the case where the signal separation part 20 is formed by the linear interference canceller. In this instance, combined received waves received by two receiving antennas ANT-R1 and ANT-R2 are converted by receivers 19R1 and 19R2 to base band signals Y1 and Y2, respectively, which are applied to input terminals 2T1 and 2T2 of the signal separation part 20. These base band signals Y1 and Y2 are weighted with weighting factors $W_{11}$ and $W_{12}$ in weighting circuits $21W_{11}$ and $21W_{12}$, respectively, and are added together in an adder circuit 22A1, the output of which is provided as an estimated signal for the one transmitted modulated signal C1. The estimated signal output is fed to a decision circuit 24D1, wherein it is decided to be larger or smaller than a threshold value and from which it is provided as the transmission signal sequence R1 to an output terminal. The difference (an estimation error) between the input and the output signal of the decision circuit 24D1 is detected by a difference circuit 23E1 and is outputted as the metric signal M1.

During the period of receiving the training signals in the transmitted frame, the training signal pattern TRN1 is provided, as a substitute for the decided output, to the difference circuit 23E1 from the register 27G1 via the switch, and a control circuit 25C1 determines the weighting factors $W_{11}$ and $W_{12}$ in such a manner as to minimize the square $|\epsilon|$ of the absolute value of the difference. The thus determined factors $W_{11}$, and $W_{12}$ are used to perform a weighted addition of the received signals Y1 and Y2 during the period of receiving the data in the transmitted frame, by which the estimated transmitted signal R1 can be obtained. The reason for which the difference output from the difference circuit 23E1, that is, the error component $\epsilon$, becomes small is that the modulated wave C2 is cancelled.

Similarly, the signals Y1 and Y2 from the input terminals 2T1 and 2T2 are weighted by weighting circuits $21W_{21}$ and $21W_{22}$, respectively, and are added together by an adder circuit 22A2, and the added output is subjected to a level decision by a decision circuit 24D2. In the training signal receiving period the training signal pattern TRN2 from the register 27G2 is provided via the switch 26S2 to a difference circuit 23E2, by which the difference between the training signal pattern and the output from the adder circuit 22A2 is obtained. The weighting factors $W_{21}$ and $W_{22}$ are determined by a control circuit 25C2 so that the difference becomes minimum. By performing a weighted addition of the input signals Y1 and Y2 through use of such weighting factors during the period of receiving the data DATA in the received frame, the modulated wave C1 is cancelled and the transmitted signal sequence R2 is outputted. In the example of FIG. 6B the metric signals M1 and M2 differ from each other. It is also possible that the sum of squares of the two metric signals M1 and M2 is distributed as a common metric signal as in the FIG. 6A example.

Thus, during the reception of the training signals the tap coefficients H1 and H2 are correctly set by the channel parameter estimation part 25 in FIG. 6A, or in FIG. 6B the weighting factors $W_{11}$, $W_{12}$, $W_{21}$ and $W_{22}$ are correctly determined.

In the interference cancellers of FIGS. 6A and 6B, when the one modulated wave, for example C1, is extracted, the other modulated wave C2 is handled as an interference wave-by this, the demodulated transmitted signal sequences R1 and R2 corresponding to the transmission signal sequences T1 and T2 contained in the respective modulated wave are extracted. The thus extracted transmitted signal sequences R1 and R2 are provided to the inverse transformation circuits 31 and 32, wherein they are subjected to a transformation inverse from that in the signal transformation part 14 (FIG. 2) at the transmitting side: thus, the received signal sequences SR1 and SR2 are generated. When the signal transformation part 14 at the transmitting side carries out such interleave as shown in FIG. 3A, two memories of different sizes, similar to those in FIG. 3A, are provided in the inverse transformation circuits 31 and 32, respectively, and are configured so that the received signal sequences R1 and R2 are read in the column direction and read out in the row direction, just opposite in direction from that in FIG. 3A. When the transmitting side effects the signal transformation by the scramble codes SC1 and SC2 as shown in FIG. 3B, multipliers are provided in the inverse transformation circuits 31 and 32 to descramble the received signal sequences R1 and R2 with the scramble codes SC1 and SC2.

The metric signals M1 and M2 representing the reliability of the signal sequences at the time of their separation, which are provided from the interference canceller in the signal separation part 20, are outputted in synchronization with the signal sequences SR1 and SR2. The metric is expressed by the level of the inverse $1/|\epsilon|$ of the estimation error in the separation processing or its square or negative $-|\epsilon|$ or $-|\epsilon|^2$, the larger the value, the higher the reliability. Moreover, in the inverse transformation, general metric values M1' and M2' of the received signal sequences SR1 and SR2 are generated using the metric used for error correction decoding. If the transformation in the signal transformation part 14 in a mere reversal of the order of the interleave or the like, the metric signals M1' and M2' by the inverse transformation are signals which are merely reverse in order from the metric signals M1 and M2. The two received signal sequences SR1 and SR2 of different metrics are provided from the inverse transformation circuits 31 and 32 to the signal reconstruction part 33, which generates optimal demodulated data DO and provides it to the output terminal OUT. The demodulated data can be generated by various methods such as those (1) which selects the received signal sequence of the larger metric, (2) which weights the decided received signal sequence with the metric, then combines it with the other signal sequence and makes a decision, and (3) which performs only interleave in the inverse transformation and performs error correction decoding while selecting data of the received signal sequence of the larger metric.

The operation described above is basically the same in the handoff and the multi-station transmission system. However, the handoff has a capability of stopping signal transmission from the old zone when the intensity of the field for receiving radio waves from the new zone increases. While in the above description the same signal has been sent from two base stations, it may be sent from three or more base stations BS1, BS2, BS3, . . . as indicated by the broken-lined base station BS3 of a third adjacent zone in FIG. 2. Letting the number of base stations be represented by N, the signal separation part 20 in FIG. 6A needs only to be provided with N subtraction circuits 21A1, 21A2, . . . , N replica generators 22R1, 22R2, . . . , N switches 2681, 2682, . . . , and N registers 27G1, 27G2, . . . . In the case of the signal separation part 20 shown in FIG. 6B, N combiners 22A1, 22A2, . . . , N decision circuits 24D1, 24D2, . . . , N difference circuits 23E1, 23E2, . . . , N control circuits 25C1, 25C2, . . . , N switches 26S1, 26S2, . . . , and N registers 27G1, 27G2, . . . , are provided In association with the signals Y1, Y2, . . . , from N receivers 19R1, 19R2, . . . . Furthermore, $N^2$ weighting circuit $21W_{11}, \ldots, 21W_{KK}$ are provided for conducting N sots of weighted additions for the N input signals Y1, Y2, . . . .

Thus, the present invention permits zone switching through use of the same channel regardless of the access scheme used. Since no interruption occurs at the time of zone switching, the reliability of fast digital signal transmission will not be Impaired. Besides, the receiving field intensity decreases at the time of zone switching, since the mobile station usually moves near the zone boundary; according to the present Invention, however, the mobile station simultaneously receives signals from a plurality of base stations—this produces a diversity effect and hence improves the transmission characteristic.

Hence, the present invention Is effective when applied to high-capacity, multimedia-oriented digital mobile communications and portable telephone systems, furthermore, it is effective when dividing a wide area into a plurality of zones and performing transmission in the broadcast mode.

What is claimed is:

1. A receiver for a mobile station which receives, from a base station in each of N adjacent zones, a modulated wave obtained by framing N pseudo-orthogonal signal sequences resulting from a transformation of a same signal and added with orthogonal training signals and selectively outputs the signal sequence transmitted from a desired base station, N being an integer equal to or greater than 2, comprising:

N antennas (ANT-R1, ANT-R2) provided at different positions from one another for receiving transmitted waves from base stations and producing a combined wave signal of the transmitted waves;

N radio frequency receivers (19R1, 19R2) each for receiving the combined wave signal from corresponding one of said N antennas and producing a received signal; and N weighted addition means $21W_{11}, 21W_{12}, 21W_{21}, 21W_{22}$, 22A1, 22A2) for generating N weighted added values for N received signals from said N antennas;

N decision means 24D1, 24D2) for determining levels of outputs from said N weighted addition means and outputting said received signals;

pattern holding means (27G1, 27G2) for holding training signal patterns peculiar to said N adjacent zones;

N subtracting means (23E1, 23E2) each for obtaining the difference between the output from one of said weighted addition means and said training signal patterns from one of said pattern holding means during the reception of said training signal in said received signal; and N control means (25C1, 25C2) for determining a weighting factor of said N weighted addition means which minimizes said difference, during the training signal receiving period.

2. A multi-station transmission method for use in a mobile communications system in which a service area is divided into a plurality of zones each having a base station, a mobile station performs communication via said base station of its visited zone, and a same signal sequence is transmitted from both said base station of said visited zone and the base station of at least one adjacent zone when said mobile station moves across the boundary between said visited zone and said adjacent zone, said method comprising the following steps:

(a) transmitting a forward signal sequence (DI) destined for said mobile station to N said base stations (BS1, BS2) including said base station of said visited zone and said base station of said at least one adjacent zone, N being an integer equal to or greater than 2;

(b) rendering from each of said N base stations said forward signal sequence to a transmission signal sequence (T1) and adding predetermined one of training signals (TRN1, TRN2), which are pseudo-orthogonal to one another, to said transmission signal sequence for each frame to generate a framed signal sequence (F1, F2) having a training signal period (TRN1, TRN2) and a data signal period (DATA) corresponding to the training signal and the transmission signal sequence, respectively;

(c) transmitting from each of said N base stations said framed signal sequence on a transmission radio wave (C1, C2) of a same channel;

(d) receiving by said mobile station transmission radio waves from said N base stations, and estimating characteristics of channels from said N base stations through use of said N preknown training signals (TRN1, TRN2) during the reception of said training signals in said received signals;

(e) generating N replicas (RP1, RP2) which simulate said framed signal sequences (F1, F2), from said estimated channel characteristics;

(f) subtracting said N replicas from said received signal sequences to produce an estimation error ($\epsilon$);

(g) performing a maximum likelihood estimation in a manner to minimize the resulting estimation error ($\epsilon$), thereby determining said N transmitted signal sequences; and (h) selectively delivering one of said n transmission signal sequences (DO).

3. A multi-station transmission method for use in a mobile communication system in which a service area is divided into a plurality of zones each having a base station, a mobile station performs communication via said base station of its visited zone, and a same signal sequence is transmitted from both said base station of said visited zone and the base station of at least one adjacent zone when said mobile station moves across the boundary between said visited zone and said adjacent zone, said method comprising the following steps:

(a) transmitting a forward signal sequence (DI) destined for said mobile station to N base stations (BS1, BS2) including said base station of said visited zone and said base station of said at least one adjacent zone, N being an integer equal to or greater than 2;

(b) rendering from each of said N base stations said forward signal sequence to a transmission signal sequence (T1, T2) and adding predetermined one of training signals (TRN1, TRN2), which are pseudo-orthogonal to one another, to said transmission signal sequence for each frame to generate a framed signal sequence (F1, F2) having a training signal period (TRN1, TRN2) and a data signal period (DATA) corresponding to the training signal and the transmission signal sequence, respectively;

(c) transmitting from each of said N base stations said framed signal sequence (F1, F2) on a transmission radio wave (C1, C2) of a same channel;

(d) receiving said mobile station the combined wave of said transmission radio waves by N receivers (19R1, 19R2) via N different antennas (ANT-R1 ANT-R2) to produce N base band outputs (Y1, Y2);

(e) determining N sets of weighting factors ($W_{11}$, $W_{12}$, $W_{21}$, $W_{22}$), each set composed of N weighting factors, by determining the N weighting factors for each of said N training signals (TRN1, TRN2), so that an estimated signal is obtained by weighting said N base band outputs (Y1, Y2) from said N receivers with the N weighting factors to produce N weighted base band outputs and adding (22A1, 22A2) the N weighted base band outputs together during the training signal period, matches (23E1, 23E2) one of said N training signals (TRN1, TRN2);

(f) obtaining N output signals (R1, R2), by weighting said N base band outputs (Y1, Y2) with N weighting factors of each of said N sets and adding the weighted N base band outputs together during the data signal period, as said N transmission signal sequences; and (g) selectively delivering one of said N transmission signal sequences.

4. A receiver for a mobile station which receives, from a base station in each N adjacent zones, a modulated wave obtained by framing N pseudo-orthogonal signal sequences resulting from a transformation of a same signal and augmented by orthogonal training signals and selectively outputs the signal sequence transmitted from a desired base stations, and receiver comprising:

signal separation means (20) which separates, by N preknown pseudo-orthogonal training signal patterns, a received wave in a same channel into N received signal sequences corresponding to said training signal patterns and outputs metrics each indicating reliability of a corresponding one of said N received signal sequences, N being an integer equal to or greater than 2;

inverse transformation means (31, 32) whereby said N separated received signal sequences are subjected to a transformation inverse from that effected at the transmitting side to restore said N transmitted signal sequences; and means (33) which selectively outputs one of said N transmitted signal sequences which has the largest metric at the time said received wave is separated into said N received signal sequences;

wherein said signal separation means (20) comprises:

N replica generating means (22R1, 22R2) which, upon each input of a received signal, generates N signal sequence candidates to simulate channels from said base stations under control of given channel parameters and generates N replicas for said received signal from said received signal sequence candidates;

subtracting means (21A1, 21A2) for subtracting said N replicas from said received signal and for outputting an estimation error;

maximum likelihood sequence estimation means (23, 24) which, upon each input of said received signal, sequentially generates all received signal sequence candidates, calculates the likelihood for each of said candidates from said estimation error and determines which one of said received signal sequences has maximum likelihood;

pattern holding means (27G1, 27G2) for holding training signal patterns peculiar to said N adjacent zones;

switching means (26S1, 26S2) through which, during the reception of said training signals in said received signal, said N training signal patterns are supplied from said pattern holding means to said N replica generating means to generate replicas of said training signals and during the reception of the other signal than said training signals in said received signal, said candidates being supplied from said maximum likelihood sequence estimation means to said N replica generating means; and channel parameter generating means (25) which generates channel parameters to be provided to said replica generating means so that said estimation error become minimum.

5. The method of claim 2,3,4, which includes, prior signal sequence into at least N different transmission signal sequences by a desired transformation procedure, and a step of obtaining N received signal sequences by subjecting said N transmitted signal sequences separated in said step (d) to processing of a transformation procedure inverse from said transformation procedure.

6. The method of claim 5, wherein said transformation procedure is one that reduces correlation among said N transmission signal sequences.

7. The method of claim 6, wherein, said transformation procedure is a procedure of interleaving said forward signal sequence at least (N-1) timings to obtain said at least N different transmission signal sequences.

8. The method of claim 2, wherein said step includes a step wherein a metric for each of said N signal sequences is calculated (24) by using said N replicas and said base band output and one of the sets of N signal sequence candidates (CSC1, CSC2) corresponding to a set of said N replicas which provided the largest metric is determined as the N transmission signal sequences (R1, R2).

* * * * *